United States Patent
Jin et al.

(10) Patent No.: US 10,229,357 B2
(45) Date of Patent: Mar. 12, 2019

(54) HIGH-CAPACITY MACHINE LEARNING SYSTEM

(71) Applicant: Facebook, Inc., Menlo Park, CA (US)

(72) Inventors: Ou Jin, Fremont, CA (US); Stuart Michael Bowers, Menlo Park, CA (US); Dmytro Dzhulgakov, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 727 days.

(21) Appl. No.: 14/851,336

(22) Filed: Sep. 11, 2015

(65) Prior Publication Data
US 2017/0076198 A1    Mar. 16, 2017

(51) Int. Cl.
*G06N 3/08*   (2006.01)
*G06N 99/00*  (2019.01)

(52) U.S. Cl.
CPC ............. *G06N 3/08* (2013.01); *G06N 99/005* (2013.01)

(58) Field of Classification Search
None
See application file for complete search history.

(56) References Cited

U.S. PATENT DOCUMENTS

| | | |
|---|---|---|
| 9,135,559 B1 | 9/2015 | Szeto et al. |
| 2009/0265290 A1 | 10/2009 | Ciaramita et al. |
| 2010/0179855 A1 | 7/2010 | Chen et al. |
| 2011/0320767 A1 * | 12/2011 | Eren .................... G06N 99/005 712/30 |
| 2012/0054040 A1 | 3/2012 | Bagherjeiran et al. |
| 2013/0191372 A1 | 7/2013 | Lee et al. |
| 2014/0108308 A1 | 4/2014 | Stout |
| 2014/0337096 A1 | 11/2014 | Gilad-Bachrach et al. |
| 2015/0106311 A1 | 4/2015 | Birdwell et al. |
| 2015/0379426 A1 | 12/2015 | Dirac et al. |
| 2016/0078361 A1 * | 3/2016 | Brueckner ........... G06N 99/005 706/12 |
| 2016/0300156 A1 | 10/2016 | Bowers et al. |
| 2016/0358101 A1 | 12/2016 | Bowers et al. |
| 2016/0358102 A1 | 12/2016 | Bowers et al. |
| 2016/0358103 A1 | 12/2016 | Bowers et al. |
| 2017/0017886 A1 * | 1/2017 | Gao ..................... G06N 5/04 |
| 2017/0124486 A1 | 5/2017 | Chan et al. |
| 2017/0124487 A1 | 5/2017 | Szeto et al. |
| 2017/0193360 A1 * | 7/2017 | Gao ..................... G06N 3/08 |

(Continued)

OTHER PUBLICATIONS

Tyree et al., Parallel Boosted Regression Trees for Web Search Ranking, International World Wide Web Conference Committee (IW3C2), 2011, pp. 387-396 (Year: 2011).*

(Continued)

*Primary Examiner* — Alan Chen
(74) *Attorney, Agent, or Firm* — Fenwick & West LLP (57) ABSTRACT

The present disclosure is directed to a high-capacity training and prediction machine learning platform that can support high-capacity parameter models (e.g., with 10 billion weights). The platform implements a generic feature transformation layer for joint updating and a distributed training framework utilizing shard servers to increase training speed for the high-capacity model size. The models generated by the platform can be utilized in conjunction with existing dense baseline models to predict compatibilities between different groupings of objects (e.g., a group of two objects, three objects, etc.).

20 Claims, 8 Drawing Sheets

(56) References Cited

U.S. PATENT DOCUMENTS

2018/0004835 A1 1/2018 Piechowicz et al.
2018/0004859 A1 1/2018 Piechowicz et al.
2018/0007145 A1 1/2018 Piechowicz et al.

OTHER PUBLICATIONS

Demšar, Janez, et al. "Orange: data mining toolbox in Python." The Journal of Machine Learning Research 14.1 (2013): 2349-2353.
Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.
Niu, F. et al., "Hogwild!: A Loc-free Approach to Parallelizing Stochastic Gradient Descent", Computer Sciences Department, University of Wisconsin-Madison, Jun. 2011, pp. 1-22.
RapidMiner Studio Manual, 2014, [online], [retrieved on Aug. 13, 2015]. Retrieved from: <http://docs.rapidminer.com/downloads/RapidMiner-v6-user-manual.pdf>, 116 pages.
U.S. Appl. No. 14/684,041 by Bowers, S., et al., filed Apr. 10, 2015.
U.S. Appl. No. 14/732,501 by Bowers, S., et al., filed Jun. 5, 2015.
U.S. Appl. No. 14/732,509 by Bowers, S., et al., filed Jun. 5, 2015.
U.S. Appl. No. 14/732,513 by Bowers, S., et al., filed Jun. 5, 2015.
U.S. Appl. No. 14/799,517 by Gao, T., et al., filed Jul. 14, 2015.
U.S. Appl. No. 15/199,335 by Piechowicz, S., et al., filed Jun. 30, 2016.
U.S. Appl. No. 15/199,351 by Piechowicz, S., et al., filed Jun. 30, 2016.
U.S. Appl. No. 15/199,403 by Piechowicz, S., et al., filed Jun. 30, 2016.
Leroux et al. A Genetic Programming Problem Definition Langauge Code Generator for the EpochX Framework, Proceedings of the Companion Publication of the 2014 Annual Conference on Genetic and Evolutionary Computation, 2014, pp. 1149-1154.
Non-Final Office Action dated Nov. 30, 2017 for U.S. Appl. No. 14/799,517 by Gao, T., et al., filed Jul. 14, 2015.
Non-Final Office Action dated Oct. 13, 2017 for U.S. Appl. No. 14/684,041 by Bowers, S., et al., filed Apr. 10, 2015.
Non-Final Office Action dated Oct. 4, 2017 for U.S. Appl. No. 14/732,501 for Bowers, S. filed Jun. 5, 2016.
Non-Final Office Action dated Sep. 25, 2017 for U.S. Appl. No. 14/732,513 for Bowers, S. filed Jun. 5, 2016.

\* cited by examiner

HIGH-CAPACITY MACHINE LEARNING SYSTEM

BACKGROUND

Various businesses rely on machine learning models to process large and complex data sets ("big data") to provide valuable services to their customers. For example, a social networking service may implement a social networking system to provide users with personalized or targeted services that utilize big data. Big data is a broad term referring to the use of predictive methods to extract values from large datasets, which are generally so complex that traditional data processing systems are often inadequate in providing relevant insights. For example, analysis of the datasets can find new correlations, trends, patterns, categories, etc. between, e.g., a user and a product or service. However, existing data processing systems generally have computing capacity for handling only small models with a limited set of parameters (e.g., 10 million parameters). On the other hand, systems that are capable of processing a larger set of parameters often take substantial time and require intensive CPU usage.

The figures depict various embodiments of this disclosure for purposes of illustration only. One skilled in the art will readily recognize from the following discussion that alternative embodiments of the structures and methods illustrated here may be employed without departing from the principles of embodiments described herein.

DETAILED DESCRIPTION

Disclosed are embodiments directed to a high-capacity training and prediction machine learning platform that can support high-capacity parameter models (e.g., with 10 billion weights). The platform implements a distributed training framework utilizing shard servers to increase training speed and a generic feature transformation layer for joint updating. The model(s) generated by the platform can be utilized in conjunction with existing dense baseline models to predict compatibilities between different groupings of objects (e.g., a group of two objects, three objects, etc.).

The platform can include a training system and a prediction system. The training system can execute a supervised learning process to learn about different ordered tuples based on multiple data sets representative of features associated with objects of the tuples. The supervised learning process can utilize at least two learning processes, or learning models, and apply a linear transformation to combine the results of the two or more learning models. The learning models can include, for example, a "gradient boosted decision trees" (GBDT) model and a neural networks model. Use of at least two different learning models advantageously "explains away" effects of individual features and of attributing knowledge to the appropriate parameters (e.g., weights) in the model, which independent counter increments cannot do. The linearly transformed result set can be used to update parameters of a final model used for predicting compatibilities (hereinafter, "prediction model"). The parameters can be weights assigned to features associated with the ordered tuples and/or groupings (e.g., more than two) of objects.

Operations of the supervised learning process can be executed in a distributed way based on database shards to enable high-capacity updating of the prediction model. That is, use of shards enables updating of a substantially high volume of parameters associated with the supervised learning process (e.g., 10 billion weights). The shards can be used in both the training stage and the prediction stage. In particular, the database shards can be organized in accordance with at least two tiered sets, where each tiered set (or at least some of the tiered sets) includes different tiers of shard servers. A particular tiered set can correspond to a particular learning model.

In an example for the training stage, the training system can employ two tiered sets, with a first tiered set allocated to a first learning model (e.g., GBDT) and a second tiered set allocated to a second learning model (e.g., Neural Networks). The first tiered set can include different tiers of shard servers, where each tier of shard servers is configured to perform an operation of a set of operations associated with the first learning model. Similarly, the second tiered set can include different tiers of shard servers, where each tier (or at least some of the tiers) of shard servers is configured to perform an operation of a set of operations associated with the second learning model. Use of the tiered sets of shard servers advantageously increases both the maximum size of the prediction model (e.g., 10 billion parameters, 32 billion parameters, etc.) and the training speed (e.g., 10 times the speed as compared to a single-server training).

As used here, the term "database shard" or "shard" is a partition of data in a database, where each shard is held on a separate database server instance to spread load. Each shard (or server) acts as the single source for a subset of data (e.g., a portion of the multiple data sets representative of features associated with a tuple). As shards can be distributed across a number of much less expensive commodity servers, such use advantageously enables faster processing at low cost.

In an example for the prediction stage, the prediction system can similarly employ the two tiered sets corresponding to the first learning model (e.g., GBDT) and the second learning model (e.g., Neural Networks). Freshly trained models output from the shard servers of the training system can be allocated to shard servers of the prediction system. Use of shards in the prediction stage advantageously enables faster and higher capacity processing.

As used herein, the term "tuple" refers to a pair of objects, such as a user u and an advertisement (hereinafter, "ad") v sharing (or not sharing, as appropriate) a particular feature. As used here, the term "feature" or "features" refers to characteristic shared between objects within a grouping (e.g., an ordered tuple). For example, the tuple is a pair of a 25 year-old user and a kids toy ad, where there is a negative conversion rate, indicating no interest in the kids toy ad from the 25 year-old user. The multiple data sets can be training datasets, e.g., $\{(\vec{u}_i, \vec{v}_i, y_i), i=1, \ldots N\}$, where $\vec{u}$ is an attribute feature vector of u with dimension m and $\vec{v}$ is an attribute feature vector of v with dimension n. Each attribute feature vector includes a vector of one or more features of a respective object (e.g., a user u or an ad v). For example, a user's features can be liked pages, demographics, installed apps, pixels visited, etc.; an ad's features can be, for example, expressed features, such as targeting keywords, or implied features, such as object IDs associated with promotional objects related to the ad. Under this simplification, the outcome y can be a binary variable $y \in \{-1,1\}$ for a pair of user-ad (e.g., indicating a "click" or "no click"), or it can be a non-binary variable (i.e., real-valued) representative of a degree of correlation for the user-ad pair (e.g., $y \in \{1.2, 0.5,$ etc.$\}$). The prediction model that is generated can attempt to learn a weight matrix w from the training data, where each parameter of the weight matrix is a weight value associated with a particular feature. The weight matrix w can then be used to compute a prediction value, or probability of compatibility, for a new tuple of objects; that is, the prediction value can be computed using a function of the weight matrix. The prediction value can provide an indication whether a particular object would be compatible with a given object. The prediction value can be used for ranking unknown data (e.g., a new pair of user and ad).

Note that while the example discussed above refers to a user and ad tuple for illustrative purpose, the disclosed embodiments may be implemented to determine similarity, or correlations, between other types of objects and groupings other than tuples (i.e., more than two objects). Examples of other objects can include a user of a social networking system and a page of the social networking system. In another example, the objects can include the user of the social networking system and an entity outside of the social networking system, e.g., a mobile application (hereinafter, "app"), conversion pixel(s), a website, a movie, a television show, an audio-streaming program, etc. In yet another example, the objects can include two products, e.g., a gaming app and a video-editing book.

Figure 1:
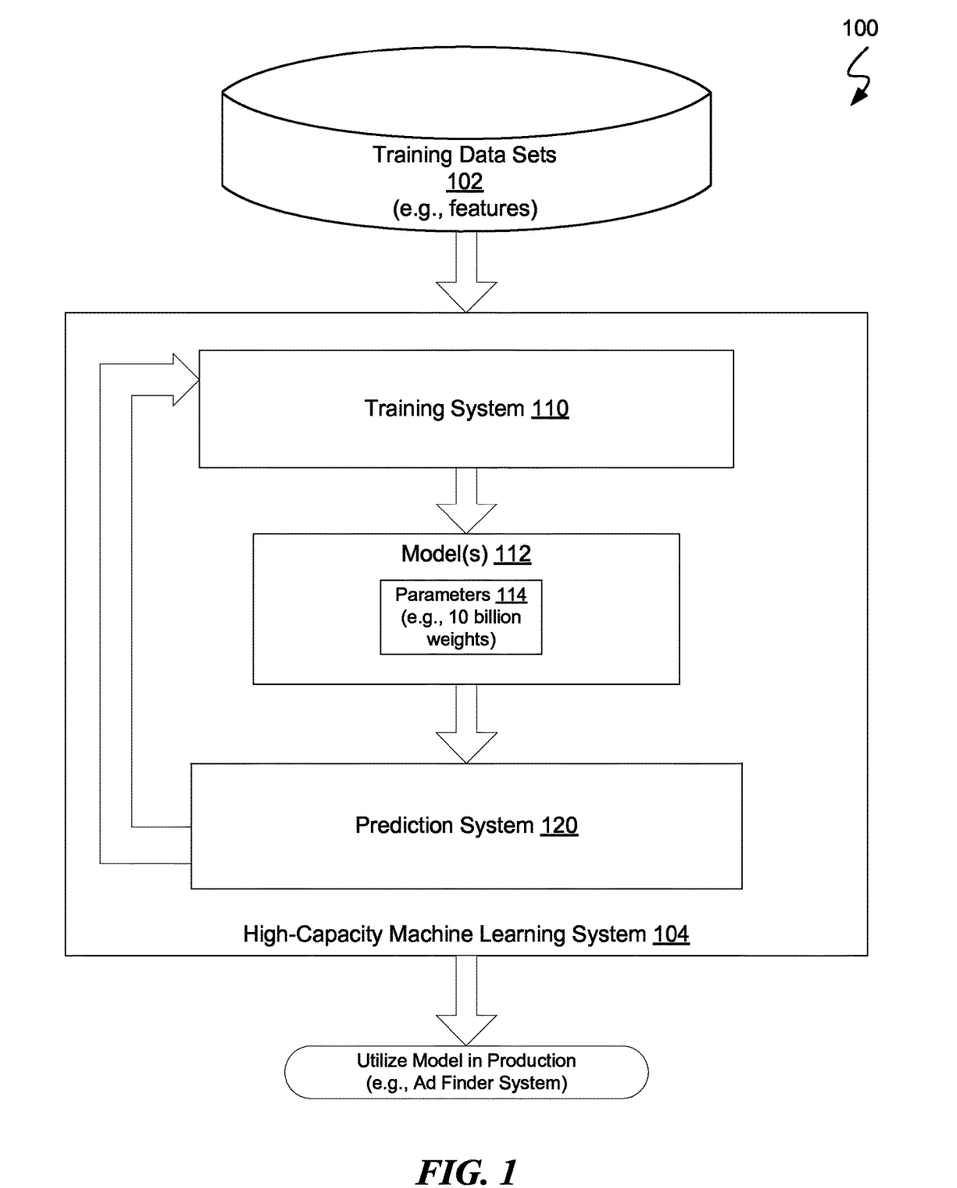
FIG. 1 is a data flow diagram of a high-capacity machine learning system for generating a prediction model for predicting compatibility between two objects based on attributes of the objects.

Referring now to the figures, FIG. 1 is a data flow diagram 100 of a high-capacity machine learning system 104 for generating a prediction model for predicting compatibility between two objects based on attributes of the objects. The high-capacity machine learning system 104 (or simply, the "system 104") can be implemented by a computer processor in a computer server system as configured by a set of executable instructions. Alternatively, the system 104 can be implemented by application specific integrated circuit (ASIC), a programmable controller, a field programmable gate array (FPGA), or other electronic circuitry.

The system 104 can train a model 112 (e.g., prediction model), such as a supervised learning model, based on training data sets 102 of features of ordered tuples of objects to determine a level of compatibility, or matching, between two objects. Note, for simplicity, FIG. 1 is discussed in reference to generation of one model; however, the high-capacity machine learning system 104 is configured to generate multiple models for predicting compatibilities for different pairings of objects.

The system 104 can train the model 112 by updating parameters 114 (e.g., weights) of the model 112 jointly by using at least two different learning processes, or models. The two learning models can include, for example, a "gradient boosted decision trees" (GBDT) model and a neural networks model. In particular, a linear transformation layer is applied to results of the two learning models to update the parameters 114. Use of at least two different learning models advantageously "explains away" effects of individual features and of attributing knowledge to the appropriate parameters (e.g., weights) in the model 112, which independent counter increments cannot do.

The system 104 generates the model 112 by processing sparse training data sets 102. The term "sparse" as used here refers to the fact that out of billions of counters, only few dozens would be pulled for a given prediction of compatibility. The training data sets 102 are input into the training system 110 which can be instantiated as a distributed, multi-threaded computer process running on a computer server system (e.g., one or more computing devices) with suitable data structures to store the model 112 or the training data sets 102. The data structures can be instantiated on one or more memory devices of the computer system.

An individual data set (of the training data sets 102 received by the training system 110) can include data about an ordered tuple of two objects, where each object is represented as a collection of attributes, or features, of the respective object. For example, the individual data set can include a feature representative of a first object (e.g., "Obj. u"), a feature representative of a second object (e.g., "Obj. v"), and a label indicating a correlation between the first object and the second object. The label can be a binary value $y \in \{-1,1\}$. For example, where Obj. u is a user and Obj. v is an ad, the label can be a "click" or "no click," a "conversion" or "no conversion," among others. In some embodiments, the label can be a non-binary value, or real-valued, to indicate a degree of correlation (e.g., −1, 0, 1, 2, 5.1, etc.).

The training system 110 can attempt to update the parameters 114 by analyzing the training data sets 102. The parameters 112 can be used to accurately determine a compatibility score for a given object and its potential matching object. The training system 110 can perform a set of operations in its training of the model 112 (and updating of the parameters 112), where the set of operations can be executed by a tiered set of shard servers. Each tier of shard servers can be configured to implement a particular operation of the set of operations. The tiered set of shard servers can be allocated based on a particular learning model used for updating the model 112. For example, a GBDT model utilizes a first tiered set of shard servers for implementing a set of operations associated with the GBDT model.

The parameters 112 can be a set of weights, or weight matrix, that is the actual mathematical object for the feature representations of the ordered tuples of objects extracted from the training data sets 102. Such weight matrix and associated model 112 can be used to determine a prediction value for predicting compatibility between objects.

The prediction system 120 can receive the trained model(s) 112 from the training system 110. Based on the model(s) 112, the prediction system 120 can determine one or more prediction values in response to requests from a production system (e.g., production system 530 of FIG. 5), where the production system can utilize the values to find a compatible object for a given object. An example production system can be an Ad Finder. The prediction system 120 can be implemented by a computer processor of the computer system as configured by a set of executable instructions. The prediction system 120 can be coupled to an interface that receives real-time training data of production events in the same feature space as the training data sets 102. The prediction system 120 can then utilize the model 112 along with production models (e.g., from local model cache) to make estimations and/or predictions of potential objects that are compatible with inputs associated with the production events.

Figure 2:
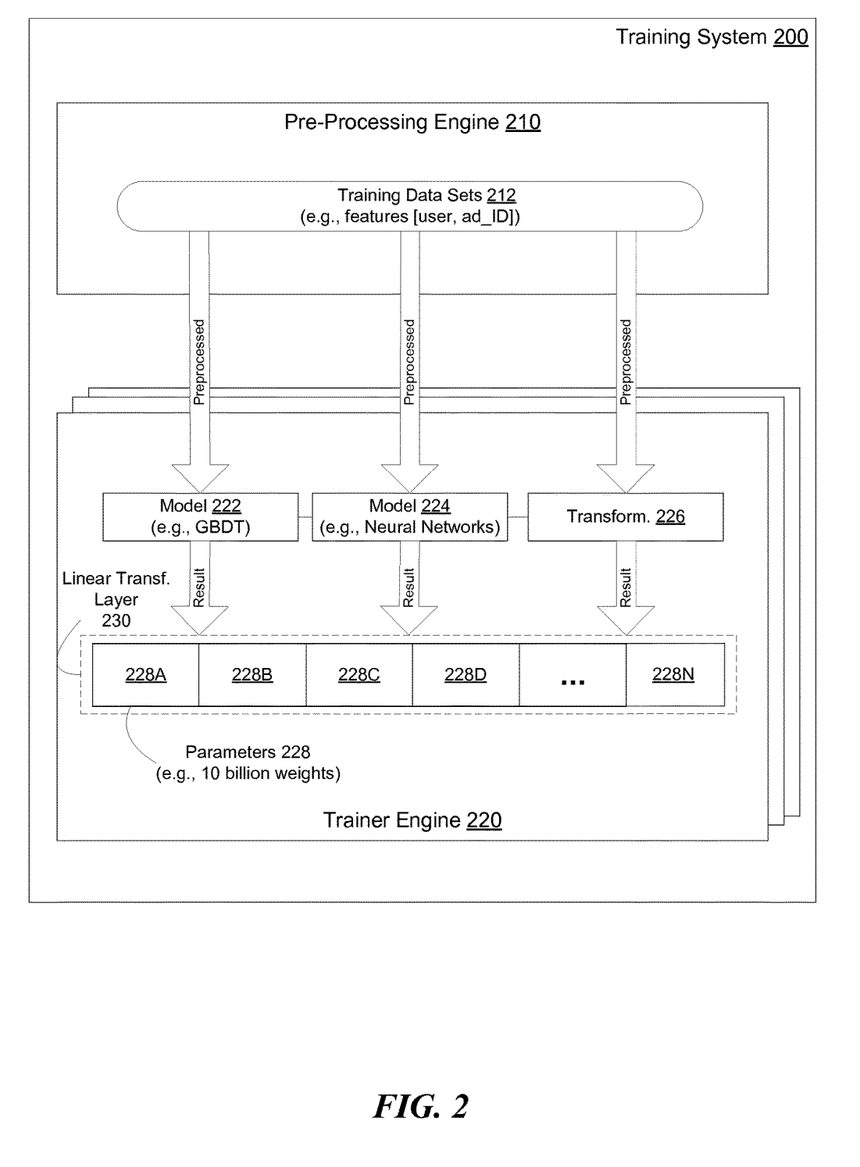
FIG. 2 is a data flow diagram of a training system of the high-capacity machine learning system.

FIG. 2 is a data flow diagram of a training system 200 of the high-capacity machine learning system. The training system 200 implements the training process in at least two stages: pre-processing stage and transformation stage. In the pre-processing stage, a pre-processing engine 210 of the training system 200 can start learning a model by loading training data 212 into the processing engine 210.

The training data 212 can include multiple individual data sets. An individual data set is representative of a training instance of the training data 212. The training data can be associated with multiple first objects and multiple second objects. That is, an individual data set i may be associated with a different user than an individual data set i+1 or an individual dataset 510 i+2. In some embodiments, the individual data sets i–N are shuffled, such that a likelihood that consecutive individual data sets correspond to the same object can be substantially low. For example, a first individual data set can include a feature of the first object (e.g., a first feature), a feature of the second object (e.g., a second feature), and a label indicating a relationship, or correlation, between the first and second objects. A second individual data set can include a feature of a third object, a feature of the second object, and a label indicating a correlation between the third and second objects.

In some embodiments, the training data 212 is prepared and stored as a partitioned Hive table. The formatted training data can then be loaded into the training system 300 (e.g., from a Hive data warehouse) efficiently and quickly. The formatted training data 212 can be loaded in parallel; that is, the preprocessing engine 210 can be a multi-threaded engine capable of parallel processing. The loaded data can be parsed for relevant information to update the parameters of the model. Certain training data can be filtered out, leaving on relevant data sets to be analyzed in the transformation stage. For example, only certain ordered tuples are selected for analysis. To further reduce the data size being analyzed, the data sets are sampled.

In the transformation stage, a trainer engine 220 receives the preprocessed data (i.e., sampled feature representations) are analyzed jointly using at least two learning models, such as model 222 and model 224. In some embodiments, a third model is applied to the processed data (e.g., feature representation(s)). For example, the model 222 can be a GBDT, the model 224 can be NN, and the third model can be some other hand-crafted transformation. Individual components, e.g., results, from the different models are linearly combined and transformed in a linear transformation layer 230. Operation in the linear transformation layer 230 enables updating on parameters 228 of the prediction model by using more than a single analysis. As discussed above, such implementation advantageously "explains away" effects of individual features and of attributing knowledge to the appropriate parameters (e.g., weights) in the model.

In some embodiments, operations of the transformation stage (and even the preprocessing stage) can be executed in a distributed way using database shards, such that pieces of the training data can be analyzed and stored in a distributed, load balanced manner. Use of database shards is further discussed in reference to FIG. 3.

Figure 3:
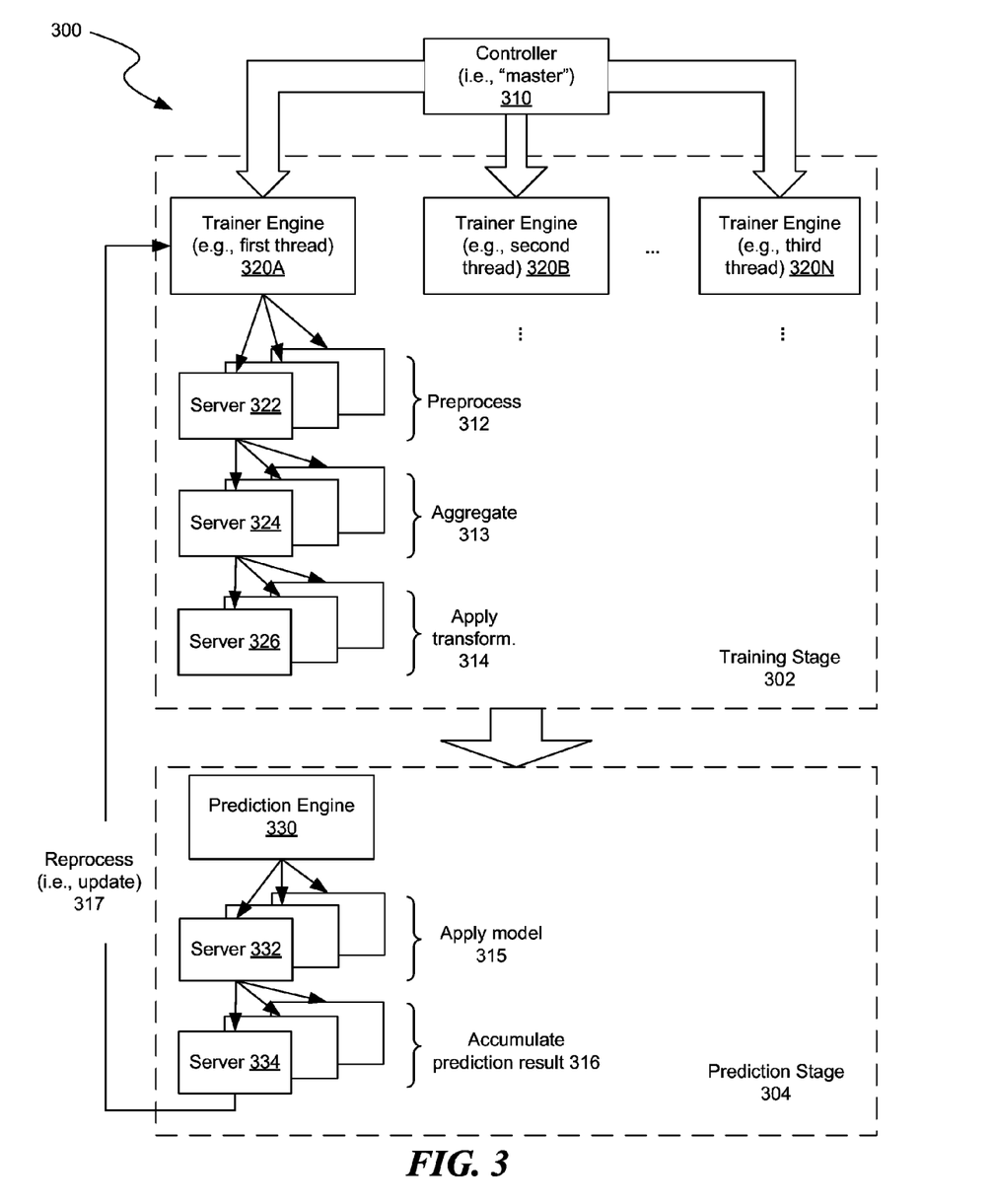
FIG. 3 is a data flow diagram of processing stages of the high-capacity machine learning system based on sharding of operations within each stage.

FIG. 3 is a data flow diagram of processing stages of the high-capacity machine learning system 300 ("system 300") based on sharding of operations within each stage, in accordance with some embodiments. The system 300 can be the system 104 of FIG. 1. The system 300 attempts to learn a prediction model through implementation of a training stage 302 and a prediction stage 304. Each stage is implemented using database shards, where pieces of the model are processed and stored at different shard servers. Use of shards enables implementation of a high capacity parameter model as it increases the speed of the update and the volume of parameters to be updated. Operations of the prediction model can be executed in a distributed way based on database shards that are organized in accordance with at least two tiered sets, where each tiered set includes different tiers of shard servers.

A controller 310 operates as a "master" server that is configured to manage and distribute pieces of the workload to the different tier sets of shard servers. A particular tiered set can correspond to a particular learning model. For example, the tiered set associated with trainer engine 320A can correspond to GBDT model, where the different tiers of shard servers in that set are configured to execute operations associated with the GBDT model. In the example, a first tier of shard servers 322 can be allocated to "preprocess" operation of the training stage 302. A second tier of shard servers can be allocated to "aggregate" operation of the training stage 302. A third tier of shard servers can be allocated to "linear combination" transformation operation of the training stage 302. At each of the first, second, and third tiers, a set of servers (e.g., 322, 324, or 326) is dedicated to execute a particular operation allocated to that tier, where the particular operation is one operation of a set of operations associated with the tiered set.

In the prediction stage 304, models updated in the training stage 302 can similarly be communicated to the prediction engine 330, which distributes the processing to a tiered set of different tiers of shard servers. For example, a first tier of shard servers 332 is configured to apply the model received from the training stage on new data received from a production system. In another example, a second tier of shard servers is configured to accumulate prediction results from various shard servers, where the accumulate result can be pushed back to the training stage to update the model being trained.

Figure 4:
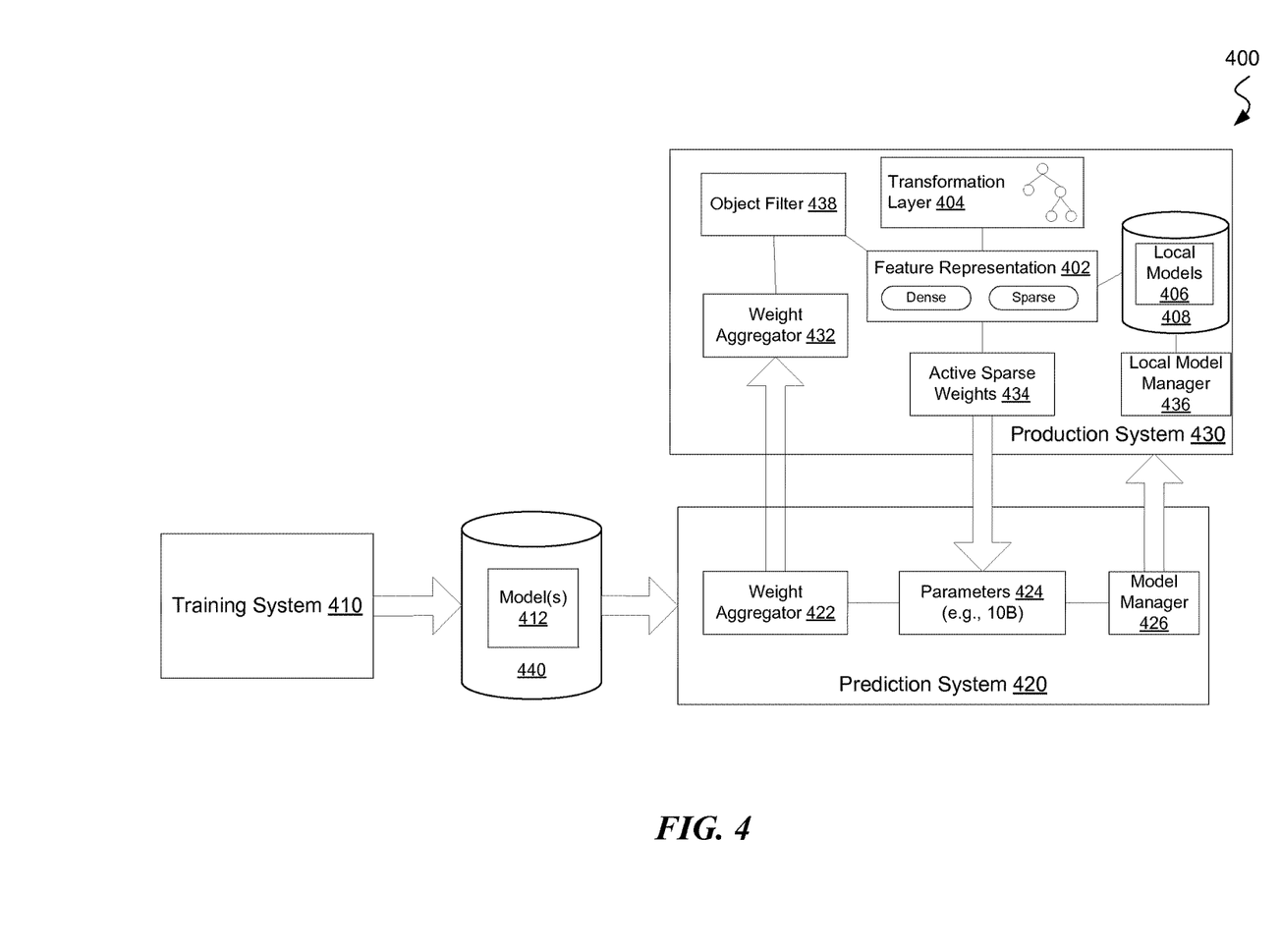
FIG. 4 is a block diagram illustrating an example environment in which a production system utilizes one or more prediction model(s) to evaluate compatibilities for various groupings of objects.

FIG. 4 is a block diagram illustrating an example environment 400 in which a production system 430 utilizes one or more prediction model(s) to evaluate compatibilities for various groupings of objects, in accordance with some embodiments. The environment 400 includes a model training system 410 for training one or more high-capacity sparse models 412 ("prediction model 412" or "prediction models 412"), a prediction system 420, and a production system 430. In some embodiments, the environment can include a training interface (not shown), a prediction interface (not shown), and a production interface for facilitating transmission of data between the training system 410, the prediction system 420, and/or the production system 430.

For ease of discussion regarding FIG. 4, consider an illustrative example of a "user A" accessing a service application implemented by a social networking system, where that social networking system utilizes the production system 430 to service user A. Responsive to user A visiting the service application, the production system sends a request to find an object that is compatible with the given object that is user A. This compatible object can be an ad. The request can include information about the given object, such as attributes (i.e., features) about user A. The information can include for example, "male, age 23, likes Techcrunch™". The production system 430 can compute prediction values, or scores, for the pairing of user A with different ads based on respective features of user A and the ads. For example, the production system 430 computes five scores for user A with five different ads, which are potential objects that can be potentially compatible with user A based on their respective features in correlation with features of user A.

In some embodiments, to compute the prediction values, the production system 430 utilizes prediction model(s) 406 stored at a local memory 408 of the production system 430. Such models 406 are loaded into the memory 408 and a CPU-heavy feature transformation 404 (e.g., decision trees evaluation) is performed. The production system 430 also sends a few (e.g., 100-200) sparse features to the prediction system 420 remote from the production system 430 to do additional transformations and conduct sparse weights lookup. The transformations performed by the prediction system 420 is relatively CPU-light, yet is able to provide more accurate prediction of compatibility for the production system 430. The prediction system 420 is configured to generate prediction values based on serialized models received from the training system 410 and parameters 424 stored by the prediction system 420. In particular, the linearly combined results from the different shards are aggregated using weight aggregator 422 and used to update the parameters 424.

Figure 5:
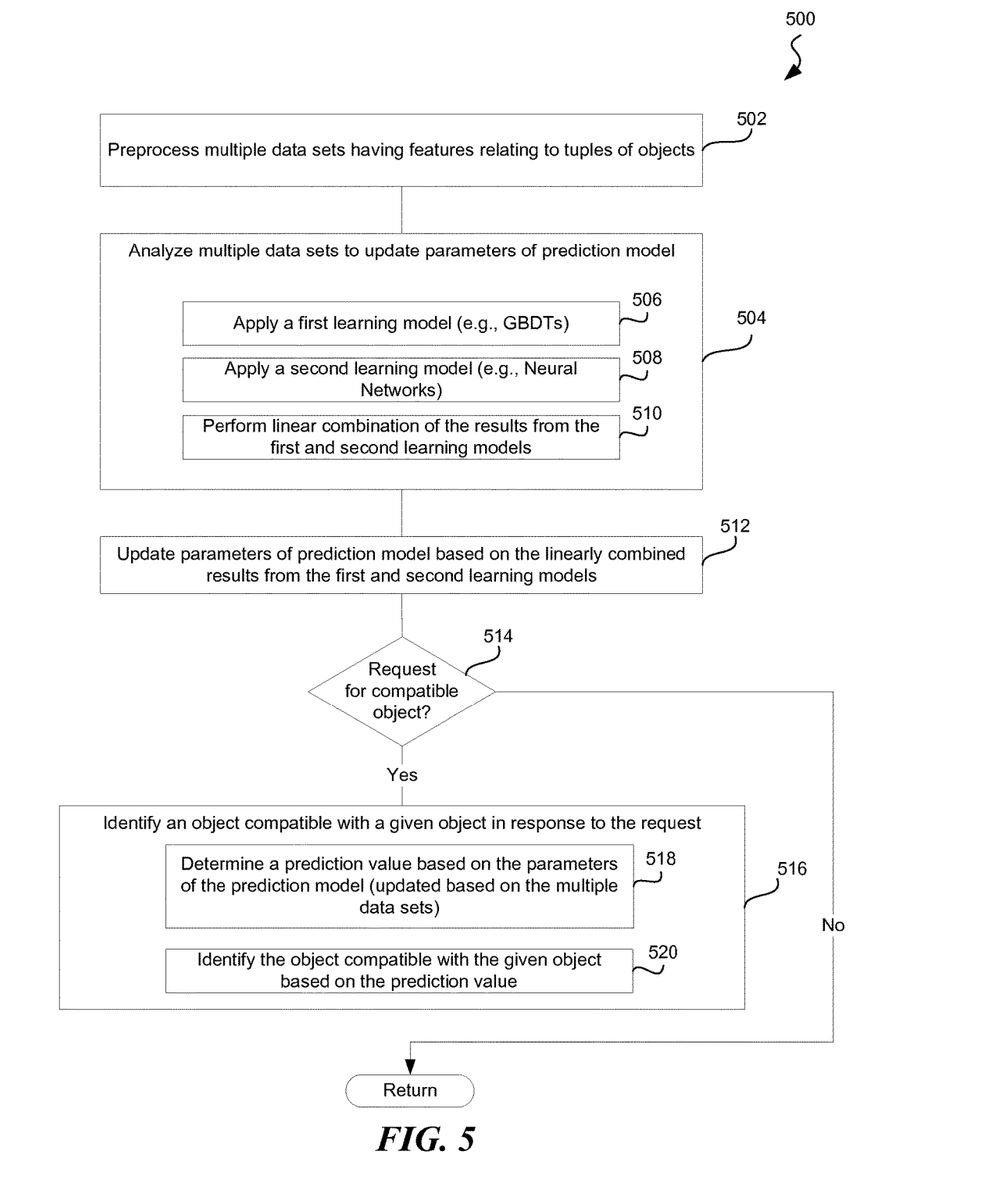
FIG. 5 is a flow chart illustrating a method of generating a prediction model based on a multiple data sets representative of object features.

FIG. 5 is a flow chart illustrating a method 500 of generating a prediction model based on a multiple data sets representative of object features, in accordance with various embodiments. In some embodiments, the method 500 can be implemented by a computer system ("System"), which can be a computer system or a distributed computer system that includes multiple servers handling different functionalities. For example, the System can be a part of or include a high-capacity, distributed machine learning infrastructure, such as the system 104 of FIG. 1. In another example, the System can be a part of or include the social networking system 1002 of FIG. 10.

At block 502, the System initializes training data in preparation for training (e.g., in preparation for serving as input to the training system 110 of FIG. 1). The training data can include training data instances, or multiple data sets. The multiple data sets can include individual data sets, where each data set is representative of feature(s) about a tuple of objects (e.g., a pairing of a particular user with a particular ad). In some embodiments, initializing the multiple data sets can include pre-processing the data sets. Such pre-processing can include loading the data sets one by one, parsing each individual data set, filtering the data sets, and selecting a sample of the data sets for processing in a next stage (i.e., training stage). Such filtering and selection can be based on preset configurations.

At block 504, the System analyzes the multiple data sets to update parameters of a machine learning model used for predicting compatibility between two objects ("prediction model"). In some embodiments, analyzing the multiple data sets includes analyzing the multiple data sets one-by-one, where each data set is analyzed by a particular processing thread resulting in the multiple data sets being analyzed in parallel (i.e., multithreaded analysis). In analyzing the multiple data sets, the System applies at least a first learning model and a second learning model to the data sets. That is, the same data sets are being analyzed by at least two different models (e.g., blocks 506 and 508).

For example, for a first individual data set, the System analyzes it using an algorithm associated with the first learning model and stores the result. The System continues with a second (i.e., next) individual data set using the same algorithm and stores the result. The results based on the first and second individual data sets are aggregated as a result set for the first learning model.

The System can similarly analyze the first individual data set using an algorithm associated with the second learning model and stores the result. The System continues with a second (i.e., next) individual data set using the same algorithm and stores the result. The results based on the first and second individual data sets are aggregated as a result set for the second learning model.

At block 510, the result set for the first learning model and the result set for the second learning model can be linearly combined (e.g., e.g., linear transformation). At block 512, the System updates parameters of the prediction model based on the linearly combined results. The parameters are weights that are affected based on the features learned from the multiple data sets.

At block 514, the System determines whether a request for finding an object compatible for a given object has been received. If there is no request, the method 500 returns. If there is a request, the method 500 continues to block 516. At block 516, the System identifies the object that is compatible with the given object. In particular, the System can identify one or more features about the given object. Based on the given object's respective feature(s), the System can determine (e.g., compute) a prediction value using the parameters of the prediction model, as indicated by block 518. The prediction value provides a probability of compatibility of a potential object with the given object.

At block 520, the System can identify the object that is compatible with the given object in the request based on the prediction value. In some embodiments, the System can determine multiple prediction values for multiple potential objects. In such embodiments, the System can rank the potential objects based on their respective prediction values and select a particular potential object as the compatible object for the given object. For example, the System selects the potential object with the highest prediction value as the compatible object. The compatible object identified by the System can be served to the given object. For example, the given object is a user of a social network and the compatible object is a particular ad that has been determined to be highly compatible with that user; the particular ad is then selected to be served to the user at the social network.

Figure 6:
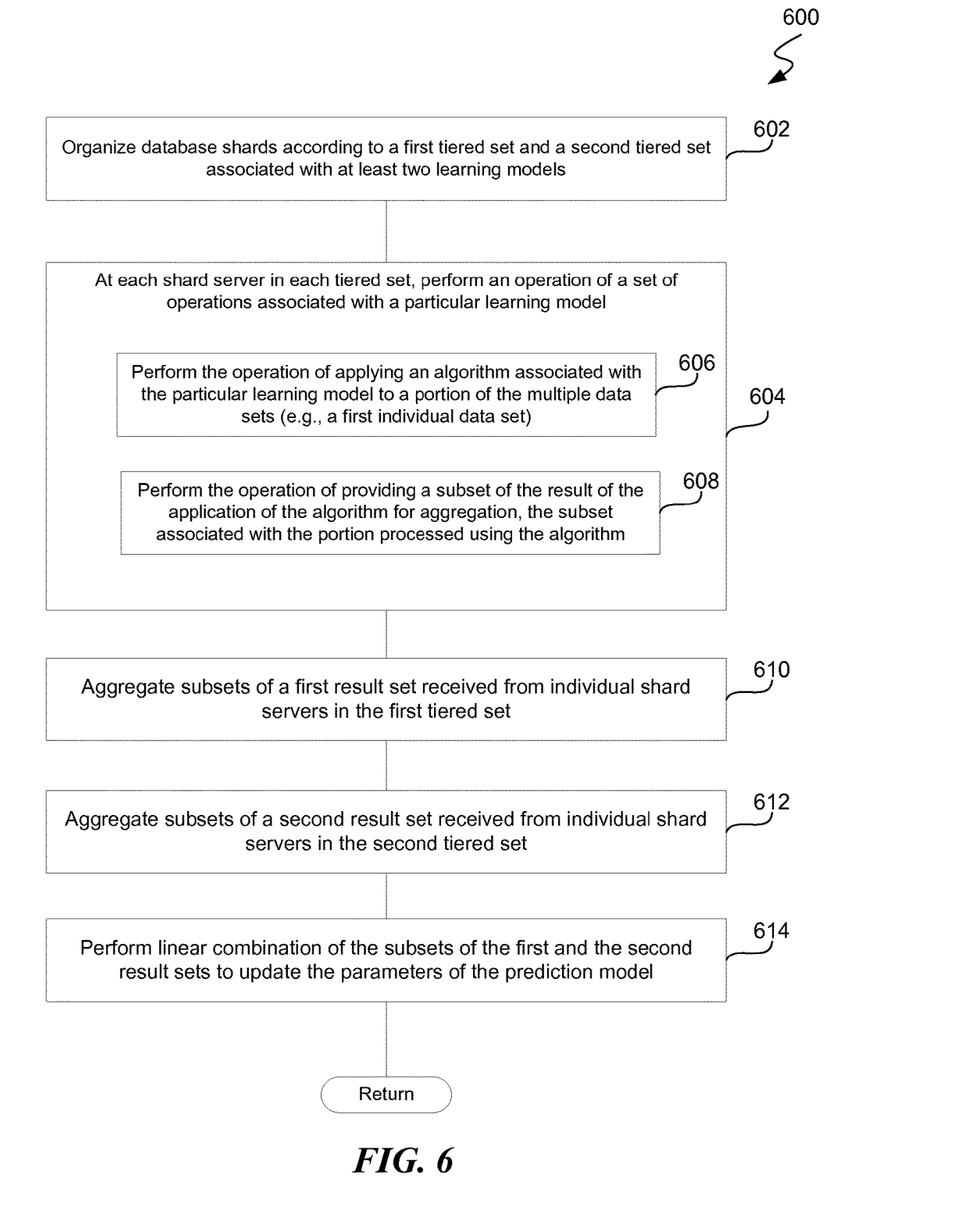
FIG. 6 is a flow chart illustrating a method of sharding operations to generate the prediction model.

FIG. 6 is a flow chart illustrating a method 600 of sharding operations to generate the prediction model, in accordance with some embodiments. In some embodiments, the method 600 can be a part of the method 500. For example, the method 600 can be a part of all or some of the processes executed in blocks 502-512 of FIG. 5. The method 600 can be implemented by the system 104 of FIG. 1. In other embodiments, the method 600 can be implemented by the social networking system 702 of FIG. 7.

At block 602, the system organizes database shards according to a first tiered set and a second tiered set associated with at least two learning models. At block 604, at each shard server in each tiered set, the server performs an operation of a set of operations associated with a particular learning model to which the tiered set is allocated. At block 606, the server performs the operation of applying an algorithm associated with the particular learning model to a portion of the multiple data sets (e.g., a first individual data set). For example, for the GBDT model, an algorithm associated with GBDT is performed on a first feature representation. The same algorithm is performed by another shard server within the same tier on a second feature representation.

At block 608, the server performs the operation of providing a subset of the result of the application of the algorithm for aggregation, where that subset is associated with the portion processed using the algorithm. For example, the result from the GBDT-based analysis of the first feature representation and the result from the GBDT-based analysis of the second feature representation is each provided to an aggregator.

At block 610, subsets of a first result set received from individual shard servers in the first tiered set are aggregated. For example, the GBDT-based result associated with the first feature representation is aggregated with the GBDT-based result from the second feature representation. At block 612, subsets of a second result set received from individual shard servers in the second tiered set. For example, the NN-based result associated with the first feature representation is aggregated with the NN-based result from the second feature representation. At block 614, linear combination of the subsets of the first and the second result sets is performed to update the parameters of the prediction model.

In regards to FIGS. 5 and 6, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Social Networking System Environment and Architecture

Figure 7:
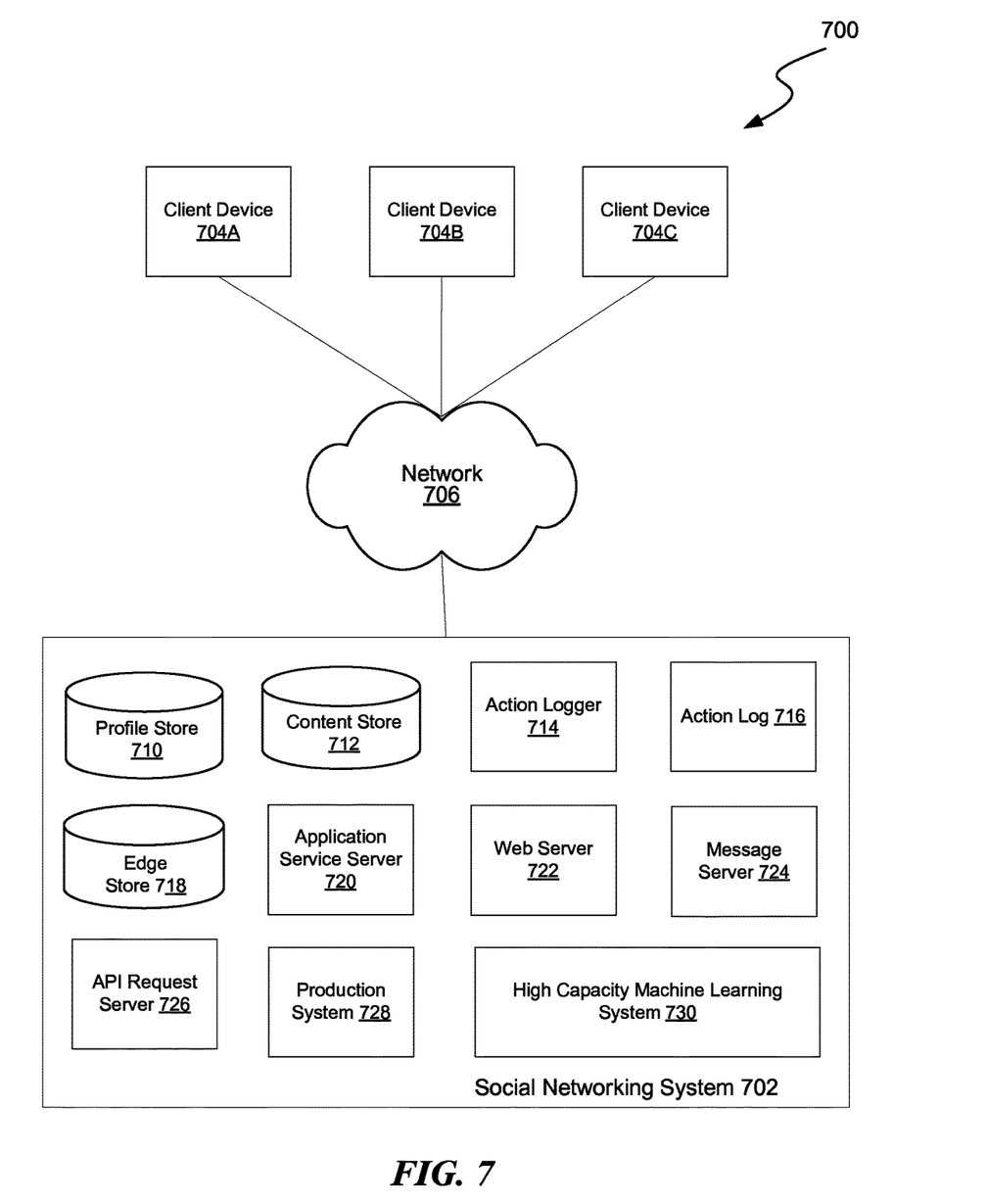
FIG. 7 is a high-level block diagram of a system environment suitable for a social networking system.

FIG. 7 illustrates an example architecture 700 of a social networking system 702, in accordance with some embodiments. Several embodiments of the high-capacity machine learning system (e.g., the system 104 of FIG. 1) can utilize or be a part of the social networking system 702. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

The client device 704A is configured to communicate with the social networking system 702 via a network channel 706 (e.g., an intranet or the Internet), where the client device 704A enables a user to interact with other users through the social networking system 702. The client device 704A is a computing device capable of receiving user input as well as transmitting and/or receiving data via the network channel 706. In at least one embodiment, the client device 704A is a conventional computer system, e.g., a desktop or laptop computer. In another embodiment, the client device 704A may be a device having computer functionality, e.g., a personal digital assistant (PDA), mobile telephone, a tablet, a smart-phone or similar device. In yet another embodiment, the client device 704A can be a virtualized desktop running on a cloud computing service. In at least one embodiment, the client device 704A executes an application enabling a user of the client device 704A to interact with the social networking system 702. For example, the client device 704A executes a browser application to enable interaction between the client device 704A and the social networking system 702 via the network channel 706. In another embodiment, the client device 704A interacts with the social networking system 702 through an application programming interface (API) that runs on the native operating system of the client device 704A, e.g., IOS® or ANDROID™.

The network channel 706 may comprise any combination of local area and/or wide area networks, using both wired and wireless communication systems. In at least one embodiment, the network channel 706 uses standard communications technologies and/or protocols. Thus, the network channel 706 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 706 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 706 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 702 includes a profile store 710, a content store 712, an action logger 714, an action log 716, an edge store 718, an application service server 720, a web server 722, a message server 724, an application service interface (API) request server 726, a production system 728, a high-capacity machine learning system 730, or any combination thereof. In other embodiments, the social networking system 702 may include additional, fewer, or different modules for various applications.

User of the social networking system 702 can be associated with a user profile, which is stored in the profile store 710. The user profile is associated with a social networking account. A user profile includes declarative information about the user that was explicitly shared by the user, and may include profile information inferred by the social networking system 702. In some embodiments, a user profile includes multiple data fields, each data field describing one or more attributes of the corresponding user of the social networking system 702. The user profile information stored in the profile store 710 describes the users of the social networking system 702, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 702 displayed in an image. A user profile in the profile store 710 may also maintain references to actions by the corresponding user performed on content items (e.g., items in the content store 712) and stored in the edge store 718 or the action log 716.

A user profile may be associated with one or more financial accounts, enabling the user profile to include data retrieved from or derived from a financial account. In some embodiments, information from the financial account is stored in the profile store 710. In other embodiments, it may be stored in an external store.

A user may specify one or more privacy settings, which are stored in the user profile, that limit information shared through the social networking system 702. For example, a privacy setting limits access to cache appliances associated with users of the social networking system 702.

The content store 712 stores content items (e.g., images, videos, or audio files) associated with a user profile. The content store 712 can also store references to content items that are stored in an external storage or external system. Content items from the content store 712 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 702. Examples of social networking content items include suggested connections or suggestions to perform other actions, media provided to, or maintained by, the social networking system 702 (e.g., pictures or videos), status messages or links posted by users to the social networking system, events, groups, pages (e.g., representing an organization or commercial entity), and any other content provided by, or accessible via, the social networking system.

The content store 712 also includes one or more pages associated with entities having user profiles in the profile store 710. An entity can be a non-individual user of the social networking system 702, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 712, enabling social networking system users to more easily interact with the vendor via the social networking system 702. A vendor identifier is associated with a vendor's page, thereby enabling the social networking system 702 to identify the vendor and/or to retrieve additional information about the vendor from the profile store 710, the action log 716 or from any other suitable source using the vendor identifier. In some embodiments, the content store 712 may also store one or more targeting criteria associated with stored objects and identifying one or more characteristics of a user to which the object is eligible to be presented.

The action logger 714 receives communications about user actions on and/or off the social networking system 702, populating the action log 716 with information about user actions. Such actions may include, for example, adding a connection to another user, sending a message to another user, uploading an image, reading a message from another user, viewing content associated with another user, attending an event posted by another user, among others. In some embodiments, the action logger 714 receives, subject to one or more privacy settings, content interaction activities associated with a user. In addition, a number of actions described in connection with other objects are directed at particular users, so these actions are associated with those users as well. These actions are stored in the action log 716.

In accordance with various embodiments, the action logger 714 is capable of receiving communications from the web server 722 about user actions on and/or off the social networking system 702. The action logger 714 populates the action log 716 with information about user actions to track them. This information may be subject to privacy settings associated with the user. Any action that a particular user takes with respect to another user is associated with each user's profile, through information maintained in a database or other data repository, e.g., the action log 716. Such actions may include, for example, adding a connection to the other user, sending a message to the other user, reading a message from the other user, viewing content associated with the other user, attending an event posted by another user, being tagged in photos with another user, liking an entity, etc.

The action log 716 may be used by the social networking system 702 to track user actions on the social networking system 702, as well as external website that communicate information to the social networking system 702. Users may interact with various objects on the social networking system 702, including commenting on posts, sharing links, and checking-in to physical locations via a mobile device, accessing content items in a sequence or other interactions. Information describing these actions is stored in the action log 716. Additional examples of interactions with objects on the social networking system 702 included in the action log 716 include commenting on a photo album, communications between users, becoming a fan of a musician, adding an event to a calendar, joining a groups, becoming a fan of a brand page, creating an event, authorizing an application, using an application and engaging in a transaction. Additionally, the action log 716 records a user's interactions with advertisements on the social networking system 702 as well as applications operating on the social networking system 702. In some embodiments, data from the action log 716 is used to infer interests or preferences of the user, augmenting the interests included in the user profile, and enabling a more complete understanding of user preferences.

Further, user actions that happened in particular context, e.g., when the user was shown or was seen accessing particular content on the social networking system 702, can be captured along with the particular context and logged. For example, a particular user could be shown/not-shown information regarding candidate users every time the particular user accessed the social networking system 702 for a fixed period of time. Any actions taken by the user during this period of time are logged along with the context information (i.e., candidate users were provided/not provided to the particular user) and are recorded in the action log 716. In addition, a number of actions described below in connection with other objects are directed at particular users, so these actions are associated with those users as well.

The action log 716 may also store user actions taken on external websites services associated with the user. The action log 716 records data about these users, including viewing histories, advertisements that were engaged, purchases or rentals made, and other patterns from content requests and/or content interactions.

In some embodiments, the edge store 718 stores the information describing connections between users and other objects on the social networking system 702 in edge objects. The edge store 718 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 702, e.g., expressing interest in a page or a content item on the social networking system, sharing a link with other users of the social networking system, and commenting on posts made by other users of the social networking system. The edge store 718 stores edge objects that include information about the edge, e.g., affinity scores for objects, interests, and other users. Affinity scores may be computed by the social networking system 702 over time to approximate a user's affinity for an object, interest, and other users in the social networking system 702 based on the actions performed by the user. Multiple interactions of the same type between a user and a specific object may be stored in one edge object in the edge store 718, in at least one embodiment. In some embodiments, connections between users may be stored in the profile store 710. In some embodiments, the profile store 710 may reference or be referenced by the edge store 718 to determine connections between users. Users may select from predefined types of connections, or define their own connection types as needed.

Note that the various types of information included in the profile store 710, the content store 712, the action log 716, and/or the edge store can be deemed as features of the user to describe the user, in accordance with some embodiments.

The application service server 720 can implement at least one application service. In several embodiments, the social networking system 702 can include multiple application service servers implementing multiple application services.

The web server 722 links the social networking system 702 via a network to one or more client devices; the web server 722 serves web pages, as well as other web-related content, e.g., Java, Flash, XML, and so forth. The web server 722 may communicate with the message server 724 that provides the functionality of receiving and routing messages between the social networking system 702 and client devices. The messages processed by the message server 724 can be instant messages, email messages, text and SMS (short message service) messages, photos, or any other suitable messaging technique. In some embodiments, a message sent by a user to another user can be viewed by other users of the social networking system 702, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 726 enables external systems to access information from the social networking system 702 by calling APIs. The information provided by the social network may include user profile information or the connection information of users as determined by their individual privacy settings. For example, a system interested in predicting the probability of users forming a connection within a social networking system may send an API request to the social networking system 702 via a network. The API request server 726 of the social networking system 702 receives the API request. The API request server 726 processes the request by determining the appropriate response, which is then communicated back to the requesting system via a network.

The production system 728 can be the production system 120 of FIG. 1. The production system 728 can enable developer/analyst users to define, modify, track, execute, compare, analyze, and/or evaluate one or more potential objects for compatibility with other objects by using machine learning model(s) (e.g., prediction model(s)) generated by the high-capacity machine learning system 730 that corresponds to one or more application services of the social networking system 702. The high-capacity machine learning system 730 can enable developer/analyst users to refine machine learning models and to evaluate the efficacy of the machine learning models.

Figure 8:
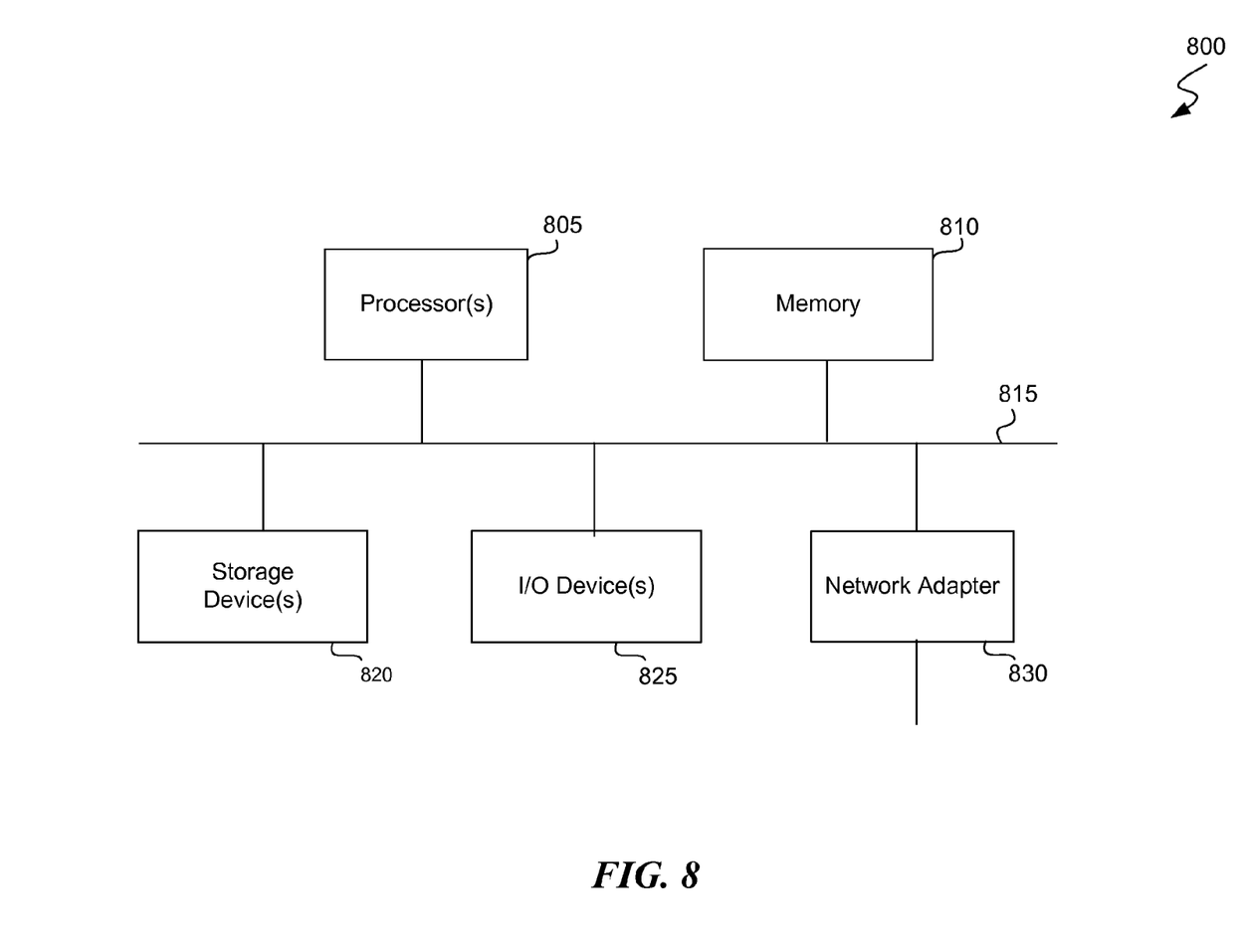
FIG. 8 is a block diagram of an example computing device, which can represent one or more computing devices or servers described here.

FIG. 8 is a block diagram of an example computing device, which can represent one or more computing devices or servers described here (e.g., the training system 110 of FIG. 1, the prediction system 120 of FIG. 1, the trainer engine 220 of FIG. 2, the prediction engine 530 of FIG. 5, the social networking system 702 of FIG. 7, etc.), in accordance with various embodiments. The computing device 800 includes one or more processors 805 and memory 810 coupled to an interconnect 815. The interconnect 815 shown in FIG. 8 is an abstraction that represents any one or more separate physical buses, point-to-point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 805 is/are the central processing unit (CPU) of the computing device 800 and thus controls the overall operation of the computing device 800. In certain embodiments, the processor(s) 805 accomplishes this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 810 is or includes the main memory of the computing device 800. The memory 810 represents any form of random access memory (RAM), read-only memory (ROM), flash memory, or the like, or a combination of such devices.

Also connected to the processor(s) 805 through the interconnect 815 are one or more storage devices 820, one or more input devices 825 (e.g., keyboard, mouse, microphone, etc.), and a network adapter 830. The network adapter 830 provides the computing device 800 with the ability to communicate with remote devices, over a network (e.g., wired or wireless network) and may be, for example, an Ethernet adapter or Fibre Channel adapter. The network adapter 830 may also provide the computing device 800 with the ability to communicate with other computers.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware (e.g., instructions) for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium can be a non-transitory storage medium and can include recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments, but not for other embodiments. Reference in this specification to where a result of an action is "based on" another element or feature means that the result produced by the action can change depending at least on the nature of the other element or feature.

What is claimed is:

1. A method, comprising:
    applying at least two different learning models to multiple data sets indicative of features associated with tuples of objects, each tuple being a pairing of a first object and a second object;
    updating parameters of a prediction model based on a linear combination of at least two result sets corresponding to the at least two learning models;
    receiving a request for identifying a compatible object for a given object based on respective features of the compatible object and the given object;
    responsive to the received request, determining, based on the updated parameters of the prediction model, a prediction value associated with the given object, the prediction value indicative of a probability of compatibility based on the respective features; and
    identifying the compatible object for the given object based on the prediction value.

2. The method of claim 1, further comprising:
    organizing database shards of a database according to at least a first tiered set and a second tiered set associated with the at least two learning models, each tiered set having multiple tiers of shard servers, the multiple tiers of shard servers configured to perform a set of operations associated with a particular learning model of the at least two learning models and to store a respective result set associated with the particular learning model in the database shards.

3. The method of claim 2, wherein the multiple tiers of shard servers in the first tiered set includes a first tier of shard servers, a second tier of shard servers, and a third tier of shard servers.

4. The method of claim 3,
    wherein each shard server of the first tier of shard servers is configured to perform a first operation associated with a first learning model of the at least two learning models;
    wherein each shard server of the second tier of shard servers is configured to perform a second operation associated with the first learning model of the at least two learning models; and
    wherein each shard server of the third tier of shard servers is configured to perform a third operation associated with the first learning model of the at least two learning models.

5. The method of claim 4, wherein the first operation associated with the first learning model is a pre-processing of a portion of the multiple data sets based on the first learning model.

6. The method of claim 4, wherein the second operation associated with the first learning model is an application of an algorithm associated with the first learning model to a portion of the multiple data sets.

7. The method of claim 4, wherein the third operation associated with the first learning model is providing a subset of a first result set resulting from an application of an algorithm associated with the first learning model to a portion of the multiple data sets.

8. The method of claim 7, further comprising:
    aggregating subsets of the first result set received from individual shard servers of the third tier of shard servers; and
    providing the aggregated subsets of the first result set for further processing.

9. The method of claim 2,
    wherein the multiple tiers of shard servers in the second tiered set includes a first tier of shard servers, a second tier of shard servers, and a third tier of shard servers;
    wherein each shard server of the first tier of shard servers is configured to perform a first operation associated with a second learning model of the at least two learning models;
    wherein each shard server of the second tier of shard servers is configured to perform a second operation associated with the second learning model of the at least two learning models; and wherein each shard server of the third tier of shard servers is configured to perform a third operation associated with the second learning model of the at least two learning models.

10. The method of claim 9,
wherein the first operation is a pre-processing of a portion of the multiple data sets;
wherein the second operation is an application of an algorithm associated with the second learning model to a portion of the multiple data sets;
wherein the third operation is providing a subset of a second result set resulting from an application of an algorithm associated with the second learning model to a portion of the multiple data sets.

11. The method of claim 10, further comprising:
aggregating subsets of the second result set received from individual shard servers of the third tier of shard servers; and
providing the aggregated subsets of the second result set for further processing.

12. The method of claim 11, further comprising:
updating a subset of the parameters of the prediction model based on the aggregated subsets of the second result set.

13. The method of claim 2, further comprising:
receiving a request for a training of the prediction model, the request including the multiple data sets;
translating the request for the training into sharded requests and providing each sharded request to a respective shard server associated with the particular learning model of the at least two learning models.

14. The method of claim 1, wherein the at least two learning models includes a first learning model that is a gradient boosted decision tree (GBDT) model.

15. The method of claim 1, wherein the at least two learning models includes a second learning model that is a neural network model.

16. A system, comprising:
a training system configured to:
preprocess multiple data sets associated with tuples of objects; and
analyze the multiple data sets to update parameters of a prediction model, wherein to analyze includes:
apply a first learning model to generate a first result set; and
apply a second learning model to generate a second result set,
wherein the first and second learning models are different learning models, and
wherein the parameters are updated based on a linear combination of the first and second result sets; and
a prediction system configured to:
determine, responsive to a request for identifying a compatible object for a given object, a prediction value associated with the given object based on the updated parameters of the prediction model; and
identify the compatible object for the given object based on the prediction value.

17. The system of claim 16, further comprising:
a database having database shards organized according to at least a first tiered set and a second tiered set associated with the first learning model and the second learning model respectively, each tiered set having multiple tiers of shard servers, the multiple tiers of shard servers configured to perform a set of operations associated with a particular learning model of the at least two learning models and to store a respective result set associated with the particular learning model in the database shards.

18. The system of claim 17,
wherein the multiple tiers of shard servers in the first tiered set includes a given tier of shard servers configured to apply an algorithm associated with the first learning model to a portion of the multiple data sets; and
wherein the training system is further configured to aggregate subsets of the first result set received from individual shard servers of the given tier of shard servers, wherein a subset of the parameters is updated based on the aggregated subsets of the first result set.

19. A computer readable storage medium storing instructions that when executed by a processor causes the processor to implement a process, the instructions comprising:
instructions for preprocessing multiple data sets by parsing at least a first dataset and a second data set, the first data set including data indicative of a first feature shared between a first object and a second object, the second data set including a second feature shared between the first object and the second object;
instructions for applying a first learning model to the multiple data sets to generate a first result set;
instructions for applying a second learning model to the multiple data sets to generate a second result set, the first and second learning models being different learning models;
instructions for updating parameters of a prediction model based on a linear combination of the first result set and the second result set;
instructions for determining, in response to a request for identifying a compatible object for a given object, a prediction value associated with the given object based on the updated parameters of the prediction model, the prediction value indicative of a probability of compatibility; and
instructions for identifying the compatible object for the given object based on the prediction value.

20. The computer readable storage medium of claim 19, further comprising:
instructions for organizing database shards of a database according to at least a first tiered set and a second tiered set associated with the first learning model and the second learning model respectively, each tiered set having multiple tiers of shard servers, the multiple tiers of shard servers configured to perform a set of operations associated with a particular learning model of the at least two learning models and to store a respective result set associated with the particular learning model in the database shards;
instructions for configuring a given tier of shard servers in the first tiered set to apply an algorithm associated with the first learning model to a portion of the multiple data sets;
instructions for configuring a given tier of shard servers in the second tiered set to apply an algorithm associated with the second learning model to the portion of the multiple data sets;
instructions for aggregating subsets of the first result set received from individual shard servers of the given tier of shard servers in the first tiered set;
instructions for aggregating subsets of the second result set received from individual shard servers of the given tier of shard servers in the second tiered set;

instructions for performing linear combination on the aggregated subsets of the first result set and the aggregated subsets of the second result set to update the parameters of the prediction model.

* * * * *